United States Patent
Arroju et al.

(10) Patent No.: US 12,542,709 B2
(45) Date of Patent: *Feb. 3, 2026

(54) DEVICE PROVISIONING USING A SUPPLEMENTAL CRYPTOGRAPHIC IDENTITY

(71) Applicant: Microsoft Technology Licensing, LLC, Redmond, WA (US)

(72) Inventors: Mounica Arroju, Redmond, WA (US); Alexander I. Tolpin, Redmond, WA (US); Nicole Elaine Berdy, Kirkland, WA (US); Anush Prabhu Ramachandran, Woodinville, WA (US); Timothy James Larden, Kirkland, WA (US); Mengxi Chi, Bellevue, WA (US); Mahesh Sham Rohera, Sammamish, WA (US); Rajeev Mandayam Vokkarne, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,539

(22) Filed: Apr. 25, 2022

(65) Prior Publication Data

US 2022/0263712 A1    Aug. 18, 2022

Related U.S. Application Data

(63) Continuation of application No. 16/827,148, filed on Mar. 23, 2020, now Pat. No. 11,343,139.

(51) Int. Cl.
*H04L 41/0806* (2022.01)
*H04L 9/32* (2006.01)
*H04L 9/40* (2022.01)

(52) U.S. Cl.
CPC ........ *H04L 41/0806* (2013.01); *H04L 9/3247* (2013.01); *H04L 9/3271* (2013.01); *H04L 63/0876* (2013.01)

(58) Field of Classification Search
CPC . H04L 41/0806; H04L 9/3247; H04L 9/3271; H04L 63/0876
See application file for complete search history.

(56) References Cited

U.S. PATENT DOCUMENTS

| 10,169,587 B1 | 1/2019 | Nix |
| 10,348,720 B2 | 7/2019 | Jakobsson |

(Continued)

FOREIGN PATENT DOCUMENTS

| CN | 102067145 A | 5/2011 |
| CN | 102859929 A | 1/2013 |

(Continued)

OTHER PUBLICATIONS

First Office Action Received for Chinese Application No. 202180023231.2, mailed on Mar. 25, 2024, 21 pages (English Translation Provided).

(Continued)

*Primary Examiner* — Azizul Choudhury
(74) *Attorney, Agent, or Firm* — Holzer Patel Drennan

(57) ABSTRACT

A device provisioning service provisions a network-connected device to access one or more service systems using a supplemental cryptographic identity of the network-connected device. An initial enrollment record (associated with an initial cryptographic identity) and a supplemental enrollment record are stored in a device provisioning service. An identity issuance request is received from the network-connected device at the device provisioning service. The identity issuance request includes the initial cryptographic identity. The supplemental cryptographic identity is (Continued)

requested from a supplemental cryptographic identity issuer identified in the initial enrollment record based on the identity issuance request. The requested supplemental cryptographic identity is received at the device provisioning service from the supplemental cryptographic identity issuer. The network-connected device is provisioned to access the one or more service systems according to the supplemental enrollment record. The supplemental cryptographic identity is communicated to the network-connected device.

23 Claims, 4 Drawing Sheets

(56) References Cited

U.S. PATENT DOCUMENTS

| | | | |
|---|---|---|---|
| 10,375,177 B1* | 8/2019 | Bretan | H04L 67/146 |
| 10,447,683 B1* | 10/2019 | Loladia | H04W 12/71 |
| 10,547,613 B1 | 1/2020 | Roths et al. | |
| 10,621,352 B2 | 4/2020 | Nix | |
| 11,258,598 B2* | 2/2022 | Yang | H04L 9/0866 |
| 11,343,139 B2 | 5/2022 | Arroju et al. | |
| 2008/0260149 A1 | 10/2008 | Gehrmann | |
| 2010/0242038 A1 | 9/2010 | Berrange | |
| 2010/0299530 A1* | 11/2010 | Bell | G06V 40/18 382/117 |
| 2014/0122873 A1 | 5/2014 | Deutsch et al. | |
| 2014/0130145 A1 | 5/2014 | Yeleswarapu et al. | |
| 2014/0317413 A1 | 10/2014 | Deutsch et al. | |
| 2016/0105420 A1* | 4/2016 | Engan | H04W 12/068 455/411 |
| 2016/0180343 A1* | 6/2016 | Poon | H04L 63/0861 705/44 |
| 2016/0285628 A1 | 9/2016 | Carrer | |
| 2019/0188684 A1* | 6/2019 | Bettesworth | G06Q 20/401 |
| 2020/0014538 A1* | 1/2020 | Liu | H04L 9/3231 |
| 2020/0065473 A1 | 2/2020 | Berdy | |
| 2020/0162255 A1* | 5/2020 | Hunt | H04L 63/083 |
| 2020/0221296 A1 | 7/2020 | Jiang et al. | |
| 2020/0313911 A1 | 10/2020 | Mondello et al. | |
| 2021/0297311 A1 | 9/2021 | Arroju et al. | |

FOREIGN PATENT DOCUMENTS

| | | |
|---|---|---|
| CN | 104486314 A | 4/2015 |
| CN | 109076075 A | 12/2018 |
| CN | 110651458 A | 1/2020 |
| WO | 2014113948 A1 | 7/2014 |

OTHER PUBLICATIONS

Communication under Rule 71(3) EPC Received for European Application No. 21709271.7, mailed on Oct. 31, 2024, 08 pages.
Notification on Grant Received for Chinese Application No. 202180023231.2, mailed on Nov. 29, 2024, 4 pages. (English Translation Provided).
Li, et al., "Light-Weight Detection of Spoofing Attacks in Wireless Networks," Wireless Information Network Laboratory (WINLAB), IEEE, 2006, pp. 845-851.
Second Office Action Received for Chinese Application No. 202180023231.2, mailed on Aug. 27, 2024, 17 pages. (English Translation Provided).
Decision to grant a European patent pursuant to Article 97(1) EPC, Received for European Application No. 21709271.7, mailed on Jul. 17, 2025, 02 pages.
"International Search Report and Written Opinion Issued in PCT Application No. PCT/US21/016985", Mailed Date: Mar. 30, 2021, 13 Pages.
Shailesh, Mota, "Secure Certificate Management and Device Enrollment at IoT Scale", Retrieved from: https://aaltodoc.aalto.fi/bitstream/handle/123456789/23159/master_Mota_Shailesh_2016.pdf?sequence=1&isAllowed=y, Jun. 30, 2016, 77 Pages.
"Authorizing Direct Calls to AWS Services", Retrieved from: https://web.archive.org/web/20191028185105/https://docs.aws.amazon.com/iot/latest/developerguide/authorizing-direct-aws.html, Oct. 28, 2019, 7 Pages.
"Certificate Issuance & Provisioning for Connected Devices", Retrieved from: https://www.digicert.com/resources/fact-sheet/certificate-issuance-provisioning-for-connected-healthcare-devices.pdf, Retrieved Date: Dec. 6, 2019, 2 Pages.
Bedekar, et al., "Managed Rooms Backbone", Application as Filed in U.S. Appl. No. 62/929,573, filed Nov. 1, 2019, 32 Pages.
Lamos, et al., "How to use different attestation mechanisms with Device Provisioning Service Client SDK for C", Retrieved from: https://docs.microsoft.com/bs-latn-ba/azure/iot-dps/use-hsm-with-sdk, Mar. 30, 2018, 9 Pages.
Sareen, et al., "Provisioning with a bootstrap certificate in AWS IoT Core", Retrieved from: https://aws.amazon.com/blogs/iot/provisioning-with-a-bootstrap-certificate-in-aws-iot-core/, Jun. 13, 2019, 11 Pages.
Communication under Rule 71(3) EPC Received for European Application No. 21709271.7, mailed on Mar. 7, 2025, 08 pages.

* cited by examiner

DEVICE PROVISIONING USING A SUPPLEMENTAL CRYPTOGRAPHIC IDENTITY

CROSS-REFERENCE TO RELATED APPLICATIONS

The present application is a Continuation of and claims benefit of priority to U.S. patent application Ser. No. 16/827,148, filed Mar. 23, 2020, entitled "DEVICE PROVISIONING USING A SUPPLEMENTAL CRYPTOGRAPHIC IDENTITY," which is specifically incorporated by reference for all that it discloses and teaches.

BACKGROUND

A device provisioning service (DPS) can be used to configure smart devices (example network-connected devices) via a network connection, such as the Internet. Each smart device is given an identifier by its manufacturer, and when the smart device is powered up and connects to the DPS to request provisioning, the DPS challenges the smart device to prove its manufacturer-given identity. For example, the smart device may be a smart sensor, plug, lightbulb, or another device (e.g., thermostat, doorbell, security camera) that is hardcoded to "wake-up" and begin registering itself with one or more different cloud-based DPSs, such as Nokia Smart Home, Google Home®, Samsung SmartThings, Nest, Phillips Hue, Smart Life, Garmin Connect, etc.

Consumer-driven expansion of the smart device market has led to increased demands for cross-solution compatibility, secure flexibility, and increased affordability. Accordingly, being forever tied to a single DPS for the life of the smart device introduces risks and undesirable constraints. For example, if the manufacturer goes out of business or otherwise terminates support of the smart device, the device owner may be left with a non-functional device. In another perspective, the credentials issued by the manufacturer may expire, be hacked, or be otherwise lost. Likewise, enhanced provisioning features may be available from different DPSs, such as from a DPS owned and implemented by an enterprise that owns the smart device. An enterprise DPS may provide coordination of provisioning among many enterprise-owned assets, the ability for cross-manufacturer provisioning, and/or enhanced security over manufacturer DPSs. cl SUMMARY The described technology provides a device provisioning service that provisions a network-connected device to access one or more service systems using a supplemental cryptographic identity of the network-connected device. An initial enrollment record (associated with an initial cryptographic identity) and a supplemental enrollment record are stored in a device provisioning service. An identity issuance request is received from the network-connected device at the device provisioning service. The identity issuance request includes the initial cryptographic identity. The supplemental cryptographic identity is requested from a supplemental cryptographic identity issuer identified in the initial enrollment record based on the identity issuance request. The requested supplemental cryptographic identity is received at the device provisioning service from the supplemental cryptographic identity issuer. The network-connected device is provisioned to access the one or more service systems according to the supplemental enrollment record. The supplemental cryptographic identity is communicated to the network-connected device.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

In at least one implementation of the described technology, a networked-connected device, such as an Internet-of-Things (IoT) device, a network-connected industrial asset, a mobile computing device, or another communications device, can be securely associated with a supplemental cryptographic identity based on an initial cryptographic identity. The network-connected device can then be provisioned using the supplemental cryptographic identity instead of or in addition to the initial cryptographic identity.

In one scenario, a device provisioning service (DPS) can be set up to process an identity issuance request from a network-connected device based on the initial cryptographic identity and an initial enrollment record stored in the DPS and to provision the network-connected device in accordance with a supplemental enrollment record associated with the supplemental cryptographic identity.

For example, the network-connected device connects to the DPS via a secure connection and presents the DPS with an identity issuance request (e.g., a certificate signing request or CSR, or a JSON Web Token or JWT) and an initial cryptographic identity to request a new identity (e.g., a new certificate) over the secure connection. In response to receipt of the identity issuance request, the DPS accesses the initial enrollment record (or another enrollment record) associated with the initial cryptographic identity. The initial enrollment record is stored at or is accessible by the DPS.

Using configuration information stored in the initial enrollment record (or another enrollment record), the DPS validates the initial cryptographic identity and the identity issuance request. If the initial cryptographic identity and the identity issuance request are validated, then the DPS can request a supplemental cryptographic identity from an identity issuer, such as a local or external certificate authority based on the validated identity issuance requests. The identity issuer returns the supplemental cryptographic identity and associates it with a supplemental enrollment record. The DPS can then provision the network-connected device using configuration information stored in the supplemental enrollment record and return the supplemental cryptographic identity to the network- connected device, which can subsequently use the supplemental cryptographic identity to connect to the DPS and other services registered by the DPS for access by the network- connected device presenting the supplemental cryptographic identity.

Figure 1:
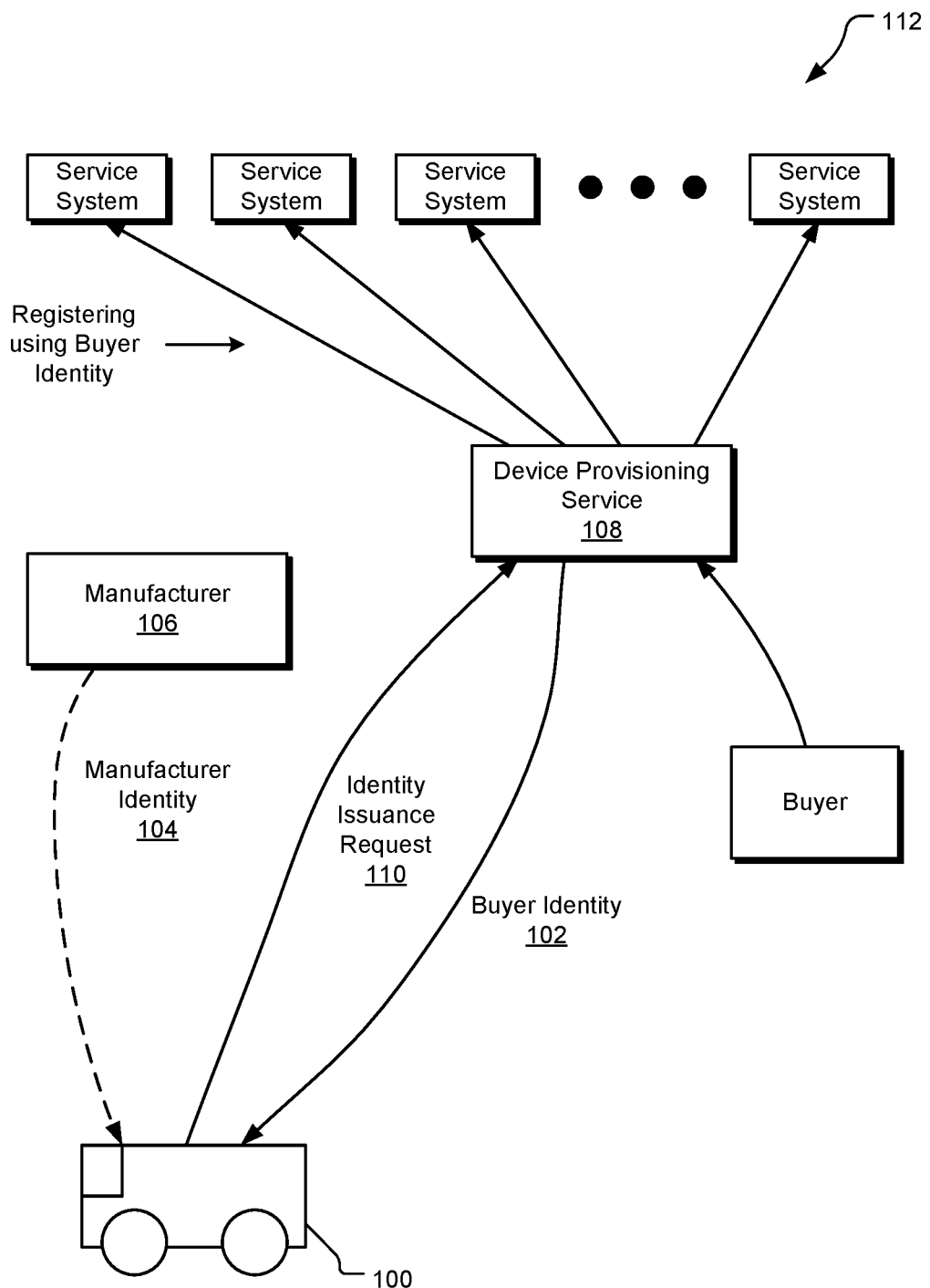
FIG. 1 illustrates example provisioning of a networked-connected device using a supplemental cryptographic identity.

FIG. 1 illustrates example provisioning of a networked-connected device 100 using a supplemental cryptographic identity (e.g., a buyer identity 102). In the illustrated implementation, the network-connected device 100 is represented by a vehicle, which may be a vehicle of a fleet purchased and/or operated by a buyer (e.g., a delivery company). The vehicle is sold in association with an initial cryptographic identity (e.g., a manufacturer identity 104), such as a cryptographic certificate issued by a manufacturer 106. However, the buyer may not wish to rely entirely on the manufacturer and its issued identity. For example, the manufacturer may go out of business, and its issued identity may no longer be trustworthy. As such, the buyer sets up its own device provisioning service 108 to issue a supplemental cryptographic identity (i.e., the buyer identity), which the buyer manages and controls, and to provision its network-connected devices. In this manner, the buyer can continue to provision and manage the network-connected device 100 through its own device provisioning service 108 and the buyer's identity 102, even if the manufacturer identity 104 is no longer valid. This approach can also allow the buyer to override and/or customize the manufacturer's provisioning of the network-connected device 100.

As illustrated in FIG. 1, the manufacturer 106 initially provides the network-connected device 100 with an initial cryptographic identity (i.e., the manufacturer identity). It should be understood that the term "initial" in this application does not mean that the network-connected device 100 did not have previous cryptographic identities. Instead, "initial" is intended to be interpreted relative to the network-connected device 100 subsequently becoming associated with the supplemental cryptographic identity (e.g., the buyer identity 102). In one implementation, to obtain provisioning using the initial cryptographic identity, the network-connected device 100 accesses a global endpoint (e.g., at a known URL) and identifies a device provisioning service from which to obtain provisioning. The global endpoint directs the network-connected device 100 to an appropriate device provisioning service for provisioning. Other provisioning methods are also contemplated.

In addition, in some implementations, the network-connected device 100 may also request a supplemental cryptographic identity and then obtain provisioning using the supplemental cryptographic identity. For example, the buyer can program the network-connected device 100 (e.g., via public APIs (application programming interfaces) or SDKs (software development kits) to specify which device provisioning service to contact when requesting a supplemental cryptographic identity and/or supplemental provisioning. Alternatively, the network-connected device 100 may obtain an identifier of a supplemental device provisioning service in the initial provisioning operation (e.g., from the initial device provisioning service), through hard-coded configuration information, in response to a remote command from the buyer or another authorized entity, based on periodic identity renewals (e.g., keeping track of the remaining useful life or RUL of its credentials and requesting a new identity when the RUL drops below a threshold), etc. In some implementations, the initial device provisioning service and the supplemental device provisioning service may be the same device provisioning service and may still apply configuration information from different enrollment records.

In one implementation, for example, the buyer or some other entity sets up the device provisioning service 108 to recognize and validate the manufacturer identity 104 presented by the network-connected device 100, the buyer creates the initial enrollment record including validation parameters associated with the initial cryptographic identity and an identifier of a particular identity issuer. The network-connected device 100 issues an identity issuance request 110 to the device provisioning service 108 to request the supplemental cryptographic identity. The identity issuance request 110 includes the initial cryptographic identity, which the device provisioning service 108 uses to access an initial enrollment record associated with the initial cryptographic identity. If the device provisioning service 108 is able to validate the identity issuance request 110, the device provisioning service 108 then requests the supplemental cryptographic identity from the identity issuer (not shown) specified in the initial enrollment record.

Validation of the identity issuance request may be performed in a variety of ways. In some implementations, the device provisioning service 108 can challenge the network-connected device 100 to prove its identity as being the manufacturer identity 104, such as using a symmetric or asymmetric key challenge to the network-connected device 100 based on the manufacturer identity 104. The device provisioning service 108 can also evaluate the identity issuance request 110 to determine whether the identity issuance request 110 was validly signed by the network-connected device 100. Additional or different validation operations may be employed. These validation operations are conditional to the device provisioning service 108 requesting the supplemental cryptographic identity from the identity issuer specified in the initial enrollment record.

Having validated the identity issuance request from the network-connected device 100, the device provisioning service 108 requests the supplemental cryptographic identity from the identity issuer specified in the initial enrollment record. The request may specify an intermediate root in the certificate chain of the supplemental cryptographic identity issuer from which the supplemental cryptographic identity is to be created. The supplemental cryptographic identity issued by the supplemental cryptographic identity issuer in response to the identity issuance request is returned to the device provisioning service 108.

The device provisioning service 108 associates the supplemental cryptographic identity with a supplemental enrollment record and uses configuration information in the supplemental enrollment record to provision the network-connected device 100. For example, the device provisioning service 108 registers the network-connected device 100 with one or more service systems 112 (e.g., systems providing IoT services, systems providing cloud services, IoT hubs) using the supplemental cryptographic identity. The device provisioning service 108 also returns the supplemental cryptographic identity as the buyer identity 102. Thereafter, the network-connected device 100 can access the same service systems 112 by presenting the supplemental cryptographic identity (i.e., the buyer identity) to those services.

Figure 2:
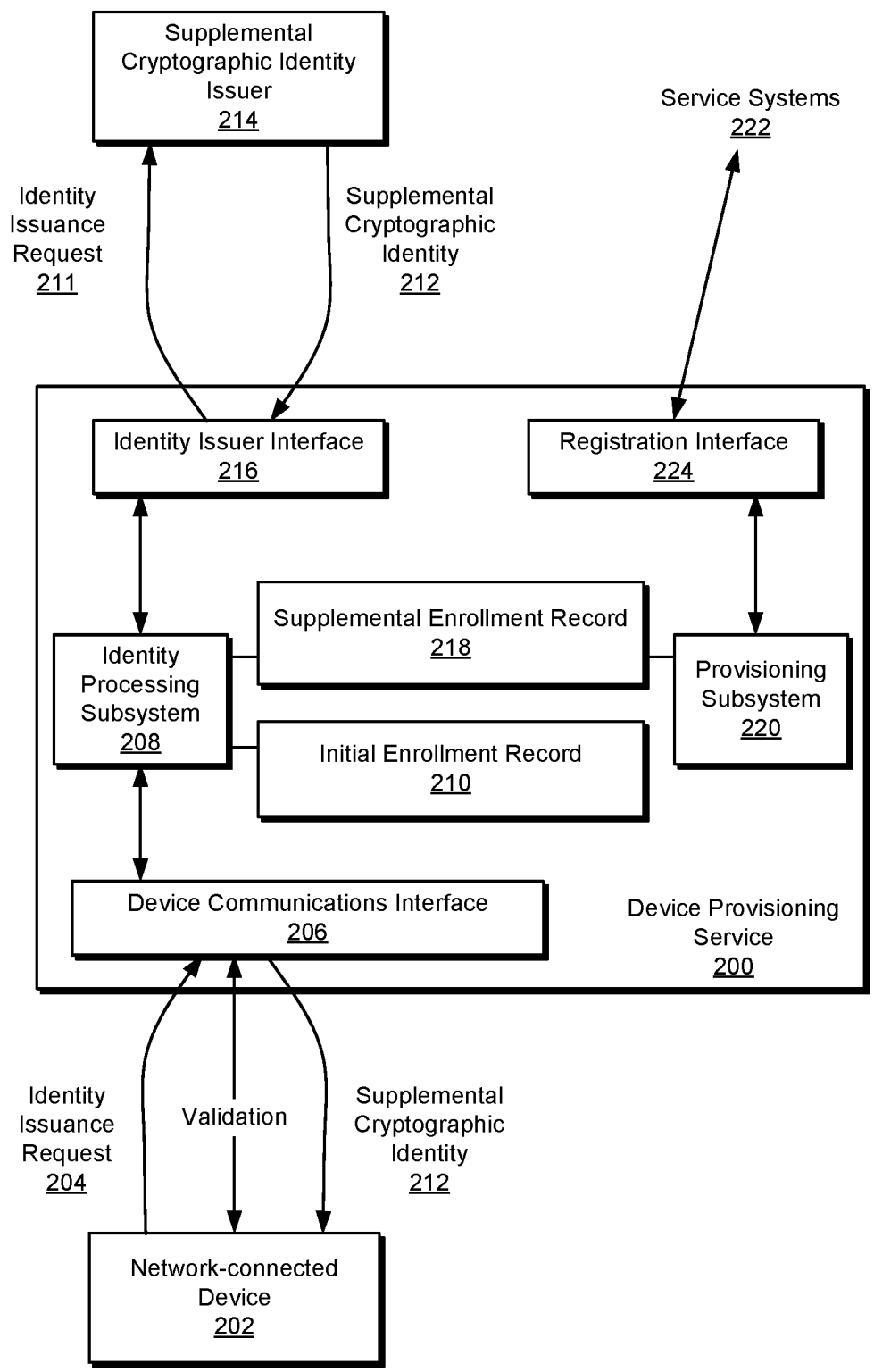
FIG. 2 illustrates an example device provisioning system.

FIG. 2 illustrates an example device provisioning service system 200. A network-connected device 202 communicates an identity issuance request 204 to a device communications interface 206 of the device provisioning service system 200. An identity processing subsystem 208 receives the identity issuance request 204 (with the initial cryptographic identity) from the device communications interface 206 and attempts to validate the identity issuance request 204 using configuration information stored in an initial enrollment record 210, which is associated with the initial cryptographic identity. Validation can include challenging the network-connected device 202 to prove the initial cryptographic identity belongs to it and/or verifying that the identity issuance request 204 was validly signed by the network-connected device 202.

If the identity processing subsystem 208 validates the identity issuance request 204, the identity processing subsystem 208 requests a supplemental cryptographic identity 212 (e.g., using an identity issuance request 211) from a supplemental cryptographic identity issuer 214 through an identity issuer interface 216 of the device provisioning service system 200. For example, the supplemental cryptographic identity issuer 214 may be a local or remote certificate authority. The identity processing subsystem 208 may also specify (e.g., with the identity issuance request 211) an intermediate root of a certificate chain maintained by the supplemental cryptographic identity issuer 214 so that the supplemental cryptographic identity 212 is created from that intermediate node.

The identity processing subsystem 208 receives the supplemental cryptographic identity 212 from the supplemental cryptographic identity issuer 214 through the identity issuer interface 216 and associates it with a supplemental enrollment record 218. The supplemental enrollment record 218 stores configuration information associated with the supplemental cryptographic identity 212 (e.g., provisioning information for that identity, validation information for that identity). As such, the configuration information in the supplemental enrollment record 218 can be used to provision, validate future requests from the network-connected device 202, and otherwise interact with the network-connected device 202 based on the supplemental cryptographic identity 212, which the network-connected device 202 presents in such interactions.

Accordingly, a provisioning subsystem 220 can retrieve provisioning information from the supplemental enrollment record 218 and communicate with one or more service systems 222 via a registration interface 224 to provision the network-connected device 202 with the one or more service systems 222 based on the supplemental cryptographic identity 212. In one implementation, such provisioning includes registering the network-connected device 202 with the one or more service systems 222 using the supplemental cryptographic identity 212. The device provisioning service system 200 also returns the supplemental cryptographic identity 212 to the network-connected device 202, which can use the supplemental cryptographic identity 212 to access the one or more service systems 222.

All described interfaces and subsystems may be implemented using a combination of hardware and/or software executing on the hardware.

Figure 3:
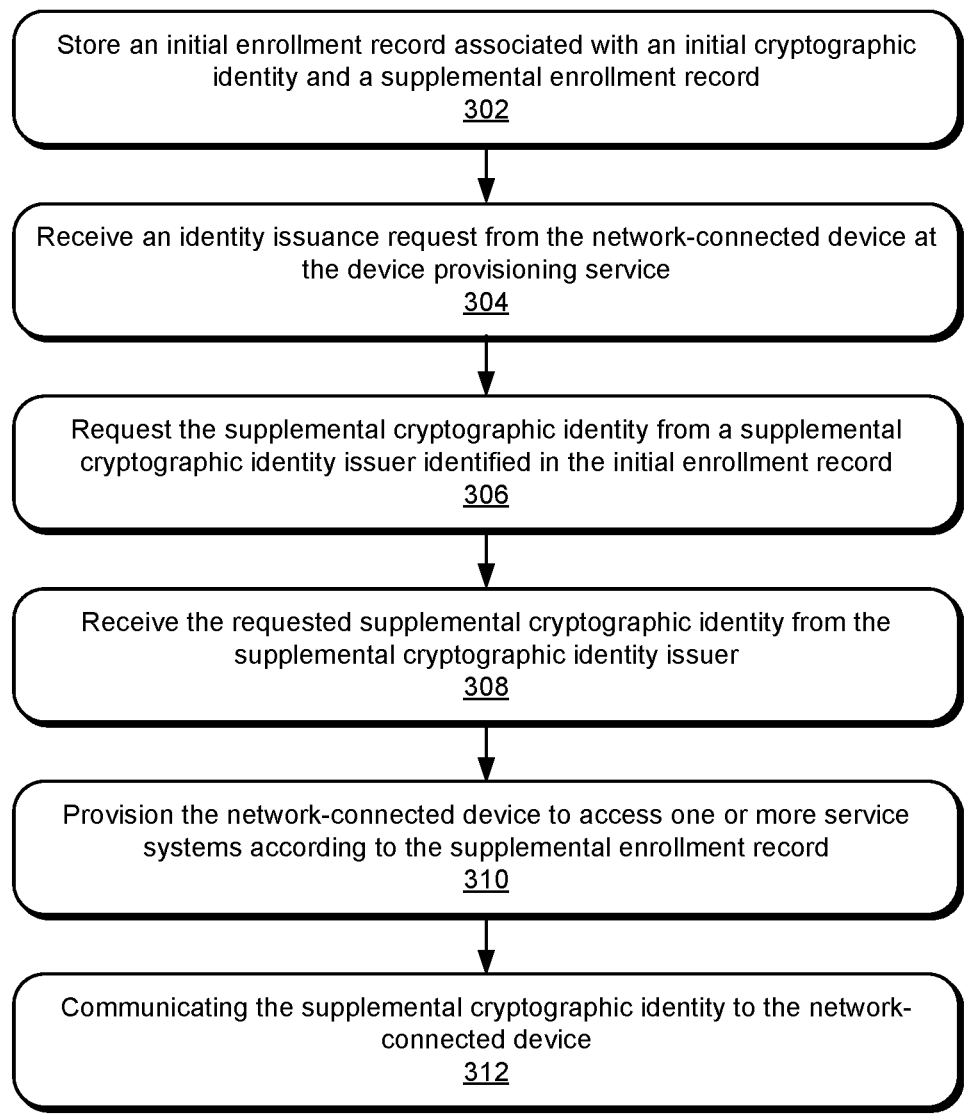
FIG. 3 illustrates example operations for provisioning of a networked-connected device using a supplemental cryptographic identity.

FIG. 3 illustrates example operations 300 for provisioning of a networked-connected device using a supplemental cryptographic identity. A storing operation 302 stores an initial enrollment record and a supplemental enrollment record at a device provisioning service. The initial enrollment record is associated with an initial cryptographic identity (e.g., is stored in associated with the initial cryptographic identity, contains validation parameters associated with the initial cryptographic identity). The supplemental enrollment record will be associated with a supplemental cryptographic identity (e.g., is stored in associated with the supplemental cryptographic identity, contains validation parameters associated with the supplemental cryptographic identity, contains provisioning information associated with the supplemental cryptographic identity).

A receiving operation 304 receives an identity issuance request from the network-connected device at the device provisioning service (e.g., through a device communications interface). An identity issuance request operation 306 requests the supplemental cryptographic identity from a supplemental cryptographic identity issuer identified in the initial enrollment record. The request may be conditional upon successful validation of the identity issuance request received from the network-connected device. The request may also specify an intermediate root of a certificate chain or some similar parameter to further describe the character of the requested identity.

Another receiving operation 308 receives the requested supplemental cryptographic identity from the supplemental cryptographic identity issuer. A provisioning operation 310 provisions the network-connected device to access one or more service systems according to the supplemental enrollment record. In one implementation, the provisioning operation 310 registers the network-connected device with the one or more service systems using the supplemental cryptographic identity. A response operation 312 communicates the supplemental cryptographic identity to the network-connected device, which can use the supplemental cryptographic identity to access the one or more service systems.

Figure 4:
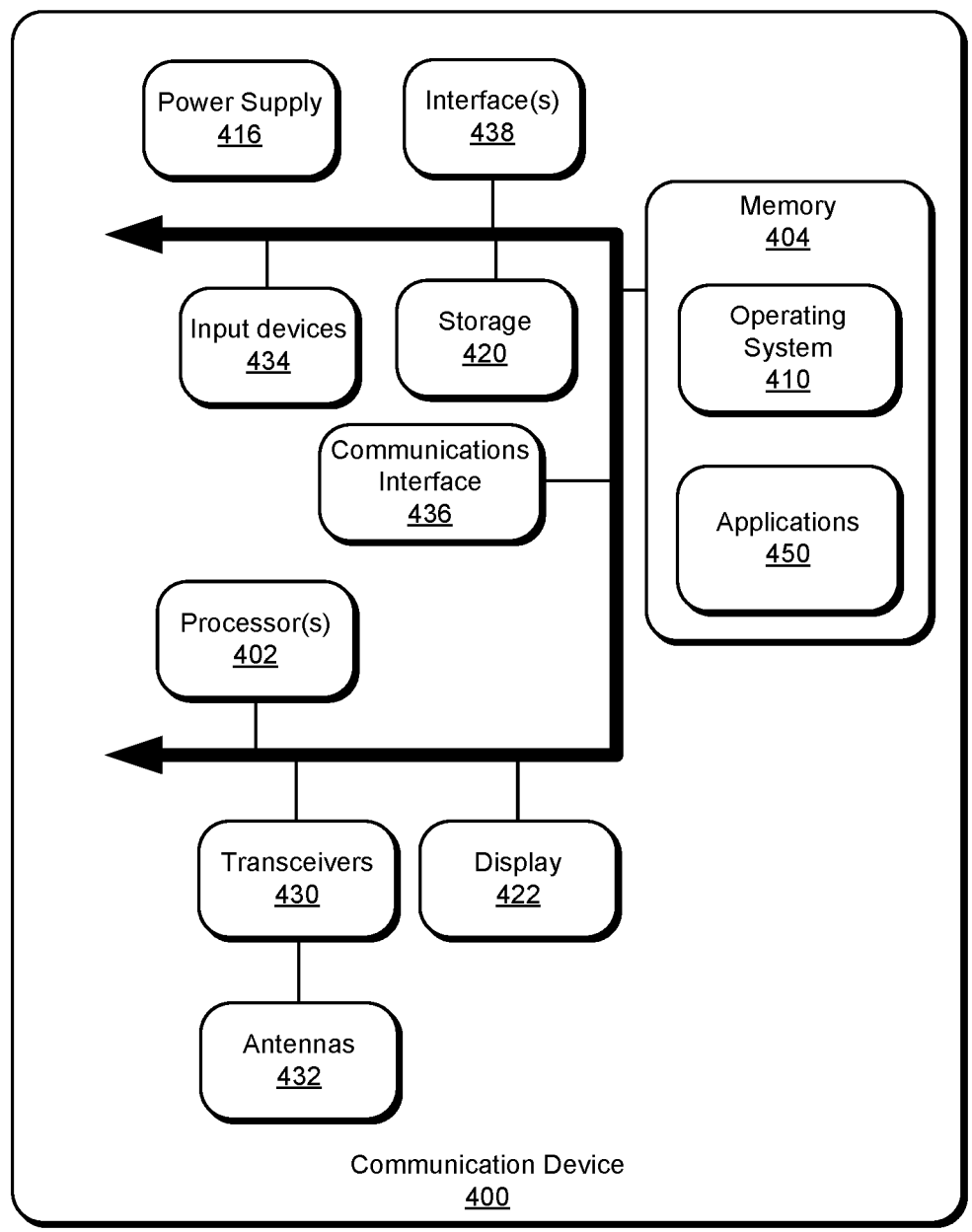
FIG. 4 illustrates an example operating environment for provisioning of a networked-connected device using a supplemental cryptographic identity.

FIG. 4 illustrates an example communication device 400 for implementing the features and operations of the described technology. The communication device 400 is an example network-connected device and may be a client device, such as a laptop, mobile device, desktop, tablet; a server/cloud device; an internet-of-things device; an electronic accessory; or another electronic device. The communication device 400 includes one or more processor(s) 402 and a memory 404. The memory 404 generally includes both volatile memory (e.g., RAM) and non-volatile memory (e.g., flash memory). An operating system 410 resides in the memory 404 and is executed by the processor(s) 402.

In an example communication device 400, as shown in FIG. 4, one or more modules or segments, such as applications 450 and other modules, are loaded into the operating system 410 on the memory 404 and/or storage 420 and executed by processor(s) 402. The storage 420 includes one or more tangible storage media devices and may store enrollment records, identities, configuration information, cryptographic data elements, and other data and be local to the communication device 400 or may be remote and communicatively connected to the communication device 400.

The communication device 400 includes a power supply 416, which is powered by one or more batteries or other power sources and which provides power to other components of the communication device 400. The power supply 416 may also be connected to an external power source that overrides or recharges the built-in batteries or other power sources.

The communication device 400 may include one or more communication transceivers 430 which may be connected to one or more antenna(s) 432 to provide network connectivity (e.g., mobile phone network, Wi-Fi®, Bluetooth®) to one or more other servers and/or client devices (e.g., mobile devices, desktop computers, or laptop computers). The communication device 400 may further include a network adapter 436, which is a type of communication device. The communication device 400 may use the adapter and any other types of communication devices for establishing connections over a wide-area network (WAN) or local-area network (LAN). It should be appreciated that the network connections shown are exemplary and that other communication devices and means for establishing a communications link between the communication device 400 and other devices may be used.

The communication device 400 may include one or more input devices 434 such that a user may enter commands and information (e.g., a keyboard or mouse). These and other input devices may be coupled to the server by one or more interfaces 438, such as a serial port interface, parallel port, or universal serial bus (USB). The communication device 400 may further include a display 422, such as a touch screen display.

The communication device 400 may include a variety of tangible processor-readable storage media and intangible processor-readable communication signals. Tangible processor-readable storage can be embodied by any available media that can be accessed by the communication device 400 and includes both volatile and nonvolatile storage media, removable and non-removable storage media. Tangible processor-readable storage media excludes communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the communication device 400. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

An example method of provisioning a network-connected device to access one or more service systems using a supplemental cryptographic identity of the network-connected device is provided. The method includes storing, in a device provisioning service, an initial enrollment record associated with an initial cryptographic identity and a supplemental enrollment record. An identity issuance request is received from the network-connected device at the device provisioning service, the identity issuance request including the initial cryptographic identity. Based on the identity issuance request, the supplemental cryptographic identity is requested from a supplemental cryptographic identity issuer identified in the initial enrollment record. The requested supplemental cryptographic identity is received at the device provisioning service from the supplemental cryptographic identity issuer. The network-connected device is provisioned to access the one or more service systems according to the supplemental enrollment record. The supplemental cryptographic identity is communicated to the network-connected device.

Another example method of any preceding method is provided, wherein the initial enrollment record identifies the supplemental cryptographic identity issuer, and the other example method further includes determining the supplemental cryptographic identity issuer from the initial enrollment record before requesting the supplemental cryptographic identity from the supplemental cryptographic identity issuer.

Another example method of any preceding method further includes associating the supplemental enrollment record with the supplemental cryptographic identity issuer at the device provisioning service, responsive to receiving the received supplemental cryptographic identity.

Another example method of any preceding method further includes cryptographically challenging the network-connected device to prove the initial cryptographic identity included in the identity issuance request and determining, using the initial enrollment record, that the network-connected device has successfully proven the initial cryptographic identity, responsive to the cryptographic challenging and before requesting the supplemental cryptographic identity.

Another example method of any preceding method further includes determining that the identity issuance request was validly signed by the network-connected device, before requesting the supplemental cryptographic identity.

Another example method of any preceding method is provided, wherein the identity issuance request includes an identifier of the device provisioning service.

Another example method of any preceding method is provided, wherein the provisioning comprises registering the network-connected device with the one or more service systems based on the supplemental cryptographic identity.

An example device provisioning system for provisioning a network-connected device to access one or more service systems using a supplemental cryptographic identity of the network-connected device is provided. The device provisioning system includes one or more hardware processors and one or more tangible data storage media configured to store an initial enrollment record associated with an initial cryptographic identity and a supplemental enrollment record. A device communications interface is configured for communications with the network-connected device. A registration interface is configured for communication with the one or more service systems. An identity provider interface is configured to communicate with one or more supplemental cryptographic identity issuers. An identity processor subsystem is executed by the one or more hardware processors and coupled to the device communications interface to receive an identity issuance request from the network-connected device at the device provisioning system. The identity issuance request includes the initial cryptographic identity. The identity processor subsystem is further coupled to the identity provider interface to request, based on the identity issuance request, the supplemental cryptographic identity from the supplemental cryptographic identity issuer identified in the initial enrollment record, to receive the requested supplemental cryptographic identity at the device provisioning system from the supplemental cryptographic identity issuer, and to communicate the supplemental cryptographic identity through the device communications interface to the network-connected device. A provisioning subsystem is executed by the one or more hardware processors and coupled to the one or more tangible data storage media and the registration interface to provision the network-connected device to access the one or more service systems according to the supplemental enrollment record.

Another example device provisioning system of any preceding system is provided, wherein the initial enrollment record identifies the supplemental cryptographic identity issuer, and the identity processor subsystem is configured to determine the supplemental cryptographic identity issuer from the initial enrollment record before requesting the supplemental cryptographic identity from the supplemental cryptographic identity issuer.

Another example device provisioning system of any preceding system is provided, wherein the provisioning subsystem is configured to associate the supplemental enrollment record with the supplemental cryptographic identity issuer at the device provisioning system, responsive to receipt of the supplemental cryptographic identity by the identity processor subsystem.

Another example device provisioning system of any preceding system is provided, wherein the identity processor subsystem is configured to cryptographically challenge the network-connected device to prove the initial cryptographic identity included in the identity issuance request and determining, using the initial enrollment record, that the network-connected device has successfully proven the initial cryptographic identity, responsive to the cryptographic challenge and before requesting the supplemental cryptographic identity.

Another example device provisioning system of any preceding system is provided, wherein the identity processor subsystem is configured to determine that the identity issuance request was validly signed by the network-connected device, before requesting the supplemental cryptographic identity.

Another example device provisioning system of any preceding system is provided, wherein the identity issuance request includes an identifier of the device provisioning system.

Another example device provisioning system of any preceding system is provided, wherein the provisioning subsystem is further configured to register the network-connected device with the one or more service systems based on the supplemental cryptographic identity.

One or more example tangible processor-readable storage media of a tangible article of manufacture encode processor-executable instructions for executing on an electronic computing device a process of provisioning a network-connected device to access one or more service systems using a supplemental cryptographic identity of the network-connected device. The process includes storing, in a device provisioning service, an initial enrollment record associated with an initial cryptographic identity and a supplemental enrollment record. An identity issuance request is received from the network-connected device at the device provisioning service, the identity issuance request including the initial cryptographic identity. Based on the identity issuance request, the supplemental cryptographic identity is requested from a supplemental cryptographic identity issuer identified in the initial enrollment record. The requested supplemental cryptographic identity is received at the device provisioning service from the supplemental cryptographic identity issuer. The network-connected device is provisioned to access the one or more service systems according to the supplemental enrollment record. The supplemental cryptographic identity is communicated to the network-connected device.

Other one or more example tangible processor-readable storage media of any preceding storage media are provided, wherein the initial enrollment record identifies the supplemental cryptographic identity issuer. The process further includes determining the supplemental cryptographic identity issuer from the initial enrollment record before requesting the supplemental cryptographic identity from the supplemental cryptographic identity issuer.

Other one or more example tangible processor-readable storage media of any preceding storage media are provided, wherein the process further includes associating the supplemental enrollment record with the supplemental cryptographic identity issuer at the device provisioning service, responsive to receiving the received supplemental cryptographic identity.

Other one or more example tangible processor-readable storage media of any preceding storage media are provided, wherein the process further includes cryptographically challenging the network-connected device to prove the initial cryptographic identity included in the identity issuance request and determining, using the initial enrollment record, that the network-connected device has successfully proven the initial cryptographic identity, responsive to the cryptographic challenging and before requesting the supplemental cryptographic identity.

Other one or more example tangible processor-readable storage media of any preceding storage media are provided, wherein the process further includes determining that the identity issuance request was validly signed by the network-connected device, before requesting the supplemental cryptographic identity.

Other one or more example tangible processor-readable storage media of any preceding storage media are provided, wherein the provisioning includes registering the network-connected device with the one or more service systems based on the supplemental cryptographic identity.

An example system for provisioning a network-connected device to access one or more service systems using a supplemental cryptographic identity of the network-connected device is provided. The system includes means for storing, in a device provisioning service, an initial enrollment record associated with an initial cryptographic identity and a supplemental enrollment record and means for requesting an identity issuance request from the network-connected device at the device provisioning service, the identity issuance request including the initial cryptographic identity. The system also includes means for requesting, based on the identity issuance request, the supplemental cryptographic identity from a supplemental cryptographic identity issuer identified in the initial enrollment record. The system also includes means for receiving the requested supplemental cryptographic identity at the device provisioning service from the supplemental cryptographic identity issuer. The system also includes means for provisioning the network-connected device to access the one or more service systems according to the supplemental enrollment record. The system also includes means for communicating the supplemental cryptographic identity to the network-connected device.

Another example system of any preceding system is provided, wherein the initial enrollment record identifies the supplemental cryptographic identity issuer, and the other example system further includes means for determining the supplemental cryptographic identity issuer from the initial enrollment record before requesting the supplemental cryptographic identity from the supplemental cryptographic identity issuer.

Another example system of any preceding system further includes means for associating the supplemental enrollment record with the supplemental cryptographic identity issuer at the device provisioning service, responsive to receiving the received supplemental cryptographic identity.

Another example system of any preceding system further includes means for cryptographically challenging the network-connected device to prove the initial cryptographic identity included in the identity issuance request and means for determining, using the initial enrollment record, that the network-connected device has successfully proven the initial cryptographic identity, responsive to the cryptographic challenging and before requesting the supplemental cryptographic identity.

Another example system of any preceding system further includes means for determining that the identity issuance request was validly signed by the network-connected device, before requesting the supplemental cryptographic identity.

Another example system of any preceding system is provided, wherein the identity issuance request includes an identifier of the device provisioning service.

Another example system of any preceding system is provided, wherein the provisioning comprises means for registering the network-connected device with the one or more service systems based on the supplemental cryptographic identity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of provisioning a network-connected device to access a service system using a supplemental cryptographic identity of the network-connected device, the method comprising:

storing, using a device provisioning system, an initial enrollment record associated with an initial cryptographic identity and a supplemental enrollment record;

receiving, using the device provisioning system, to an identity issuance request from the network-connected device at the device provisioning system, the supplemental cryptographic identity being received at the device provisioning system from a supplemental cryptographic identity issuer identified in the initial enrollment record, the identity issuance request including the initial cryptographic identity; and provisioning, using the device provisioning system, the network-connected device to access the service system according to the supplemental enrollment record.

2. The method of claim 1, further comprising:

requesting, using the device provisioning system based on the identity issuance request, the supplemental cryptographic identity from the supplemental cryptographic identity issuer identified in the initial enrollment record; and determining using the device provisioning system the supplemental cryptographic identity issuer from the initial enrollment record before requesting the supplemental cryptographic identity from the supplemental cryptographic identity issuer.

3. The method of claim 1 further comprising:

requesting, using the device provisioning system based on the identity issuance request, the supplemental cryptographic identity from the supplemental cryptographic identity issuer identified in the initial enrollment record; and associating, using the device provisioning system, the supplemental enrollment record with the supplemental cryptographic identity issuer at the device provisioning system, service, responsive to receiving the supplemental cryptographic identity.

4. The method of claim 1 further comprising:

cryptographically challenging, using the device provisioning system, the network-connected device to prove the initial cryptographic identity included in the identity issuance request; and determining, using the device provisioning system, that the network-connected device has successfully proven the initial cryptographic identity, responsive to the cryptographic challenging and before requesting the supplemental cryptographic identity.

5. The method of claim 1, further comprising:

determining, using the device provisioning system, that the identity issuance request was validly signed by the network-connected device, before requesting the supplemental cryptographic identity.

6. The method of claim 1, wherein the identity issuance request includes an identifier of the device provisioning system.

7. The method of claim 1, wherein the provisioning comprises:

registering, using the device provisioning system, the network-connected device with the service system based on the supplemental cryptographic identity.

8. A device provisioning system for provisioning a network- connected device to access a service system using a supplemental cryptographic identity of the network-connected device, the device provisioning system comprising:

one or more hardware processors;

one or more tangible data storage media configured to store an initial enrollment record associated with an initial cryptographic identity and a supplemental enrollment record;

device communications interface hardware configured for communications with the network-connected device;

registration interface hardware configured for communication with the service system;

identity provider interface hardware configured to communicate with one or more supplemental cryptographic identity issuers;

an identity processor subsystem executed by the one or more hardware processors and coupled to the device communications interface hardware to receive an identity issuance request from the network-connected device at the device provisioning system, the supplemental cryptographic identity being received at the device provisioning system from a supplemental cryptographic identity issuer identified in the initial enrollment record, the identity issuance request including the initial cryptographic identity; and a provisioning subsystem executed by the one or more hardware processors and coupled to the one or more tangible data storage media and the registration interface hardware to provision the network-connected device to access the service system according to the supplemental enrollment record.

9. The device provisioning system of claim 8 wherein the initial enrollment record identifies the supplemental cryptographic identity issuer, and the identity processor subsystem is configured to determine the supplemental cryptographic identity issuer from the initial enrollment record before requesting the supplemental cryptographic identity from the supplemental cryptographic identity issuer.

10. The device provisioning system of claim 8 wherein the provisioning subsystem is configured to associate the supplemental enrollment record with the supplemental cryptographic identity issuer at the device provisioning system, responsive to receipt of the supplemental cryptographic identity by the identity processor subsystem.

11. The device provisioning system of claim 8 wherein the identity processor subsystem is configured to cryptographically challenge the network-connected device to prove the initial cryptographic identity included in the identity issuance request and determining, using the initial enrollment record, that the network-connected device has successfully proven the initial cryptographic identity, responsive to the cryptographic challenge and before requesting the supplemental cryptographic identity.

12. The device provisioning system of claim 8 wherein the identity processor subsystem is configured to determine that the identity issuance request was validly signed by the network-connected device, before requesting the supplemental cryptographic identity.

13. The device provisioning system of claim 8, wherein the identity issuance request includes an identifier of the device provisioning system.

14. The device provisioning system of claim 8 wherein the provisioning subsystem is further configured to register the network-connected device with the service system based on the supplemental cryptographic identity.

15. One or more tangible processor-readable storage media of a tangible article of manufacture encoding processor-executable instructions for executing on an electronic computing device of a device provisioning system a process of provisioning a network-connected device to access a service system using a supplemental cryptographic identity of the network-connected device, the process comprising:

storing an initial enrollment record associated with an initial cryptographic identity and a supplemental enrollment record;

receiving an identity issuance request from the network-connected device at the device provisioning system, the supplemental cryptographic identity being received at the device provisioning system from a supplemental cryptographic identity issuer identified in the initial enrollment record, the identity issuance request including the initial cryptographic identity; and provisioning the network-connected device to access the service system according to the supplemental enrollment record.

16. The one or more tangible processor-readable storage media of claim 15, wherein the process further comprises:

requesting, based on the identity issuance request, the supplemental cryptographic identity from the supplemental cryptographic identity issuer identified in the initial enrollment record; and determining the supplemental cryptographic identity issuer from the initial enrollment record before requesting the supplemental cryptographic identity from the supplemental cryptographic identity issuer.

17. The one or more tangible processor-readable storage media of claim 15, wherein the process further comprises:

requesting, based on the identity issuance request, the supplemental cryptographic identity from the supplemental cryptographic identity issuer identified in the initial enrollment record; and associating the supplemental enrollment record with the supplemental cryptographic identity issuer at the device provisioning system, responsive to receiving the supplemental cryptographic identity.

18. The one or more tangible processor-readable storage media of claim 15, wherein the process further comprises:

cryptographically challenging the network-connected device to prove the initial cryptographic identity included in the identity issuance request; and determining that the network-connected device has successfully proven the initial cryptographic identity, responsive to the cryptographic challenging, and before requesting the supplemental cryptographic identity.

19. The one or more tangible processor-readable storage media of claim 15, wherein the process further comprises:

determining that the identity issuance request was validly signed by the network-connected device, before requesting the supplemental cryptographic identity.

20. The one or more tangible processor-readable storage media of claim 15, wherein the provisioning comprises:

registering the network-connected device with the service system based on the supplemental cryptographic identity.

21. The method of claim 1, wherein provisioning comprises:

transmitting, using the device provisioning system, the supplemental cryptographic identity to the network-connected device.

22. The method of claim 1, wherein the initial cryptographic identity includes a first certificate specific to the network-connected device, wherein the supplemental cryptographic identity includes a second certificate specific to the network-connected device.

23. The one or more tangible processor-readable storage media of claim 15, wherein the initial cryptographic identity includes a first certificate specific to the network-connected device, wherein the supplemental cryptographic identity includes a second certificate specific to the network-connected device.

* * * * *